United States Patent [19]

Kibayashi et al.

[11] Patent Number: 5,573,104
[45] Date of Patent: Nov. 12, 1996

[54] BELT FEEDING DEVICE

[75] Inventors: Susumu Kibayashi; Junichi Murakami; Tsutomu Matsuzaki; Kunimasa Aoshima; Mamoru Kido; Naohisa Fujita, all of Ebina, Japan

[73] Assignee: Fuji Xerox Co., Ltd., Tokyo, Japan

[21] Appl. No.: 422,260

[22] Filed: Apr. 14, 1995

[30] Foreign Application Priority Data

May 12, 1994 [JP] Japan .................... 6-098903

[51] Int. Cl.⁶ ................................. B65G 21/20
[52] U.S. Cl. ........................... 198/840; 271/275
[58] Field of Search ................... 271/198, 275, 271/264; 198/806, 840, 842

[56] References Cited

U.S. PATENT DOCUMENTS

| | | | |
|---|---|---|---|
| 3,102,632 | 9/1963 | Moser et al. | 271/198 |
| 3,973,446 | 8/1976 | Vasilantone | 198/800 |
| 4,011,939 | 3/1977 | Conrad | 198/840 |
| 4,221,480 | 9/1980 | Spehkley | 198/840 |
| 4,832,186 | 5/1989 | Conrad | 198/806 |
| 4,913,279 | 4/1990 | Tonissen | 198/842 |
| 5,004,223 | 4/1991 | Okui | 271/198 |
| 5,394,222 | 2/1995 | Genouese | 198/806 |

FOREIGN PATENT DOCUMENTS

| | | |
|---|---|---|
| 58-177811 | 10/1983 | Japan . |
| 59-173059 | 11/1984 | Japan . |
| 62-186180 | 11/1987 | Japan . |

Primary Examiner—William E. Terrell
Assistant Examiner—T. Kelly
Attorney, Agent, or Firm—Oliff & Berridge

[57] ABSTRACT

A belt feeding device including a plurality of belt feeding rolls, a belt wrapped around the rolls, and at least a pair of guide members each having an edge guide surface against which either side edge of the belt abuts in crosswise movement of the belt. The outer circumferential surface of each roll is formed with a plurality of ring-shaped slits axially spaced a distance w from each other, each of the slits having a depth h and a width m. The values of h, m, and w are set so that a load to an axial displacement of the belt wrapped around the rolls at a position of each guide member becomes 80 N/mm or less. Accordingly, an edge force acting between either side edge of the belt and the corresponding guide member against which the side edge of the belt abuts can be reduced to 15N or less.

8 Claims, 15 Drawing Sheets

BELT FEEDING DEVICE

BACKGROUND OF THE INVENTION

1. Field of the Invention

The present invention relates to a belt feeding device for use in an image forming apparatus such as an electrophotographic copying machine.

The belt feeding device is used as a device for feeding an image supporting body such as a belt-shaped photosensitive body or intermediate transfer body, or a device for feeding a sheet of paper in an image forming apparatus such as an electrophotographic copying machine.

2. Description of the Related Art

In such a belt feeding device as mentioned above, a crosswise position of a belt must be controlled in a predetermined range.

The following techniques are known as the related art for controlling the crosswise position of the belt.

(1) Technique shown in FIG. 14, or described in Japanese Utility Model Laid-open No. Sho 62-186180:

According to the method shown in FIG. 14, a pair of belt-shaped side stops 03 are formed at both end portions of the back surface of a belt 02 wrapped around a roll 01. The side stops 03 are guided by both ends of the roll 01 or grooves formed on the roll 01, thereby controlling the crosswise position of the belt 02. However, it is not easy to form the side stops 03 on the belt 02, causing an increase in cost. In case the belt 02 is frequently exchanged, this method is very uneconomical. In addition, the side stops 03 are prone to separate from the belt 02.

(2) Technique shown in FIG. 15, or described in Japanese Utility Model Laid-open No. Sho 59-173059:

According to the method shown in FIG. 15, a pair of flanges 04 are formed on both ends of a roll 01, and both side edges of a belt 02 wrapped around the roll 01 are adapted to come into contact with the flanges 04, thereby controlling the crosswise position of the belt 02. Unlike the method shown in FIG. 14, no side stops are formed on the belt 02, so that the belt 02 can be simply made. However, since either side edge of the belt 02 comes into direct contact with the opposing flange 04, there is a possibility of occurrence of belt damage. Specifically, crosswise movement of the belt 02 is suppressed by either flange 04, causing axial slippage of the belt 02 on the roll 01. At this time, a load (edge force) applied between either side edge of the belt 02 and the opposing flange 04 is equal to a load of axial slippage of the belt 02 on the roll 01, whose value becomes tens of N (Newton). This load or edge force causes belt damage.

This edge force varies with the material of the belt 02. For example, when the material of the belt 02 is primarily composed of PET (polyethylene terephthalate), PVdF (polyvinylidene fluoride), polycarbonate, or the like, an edge force of 15N or less provides a good result regarding the edge damage to the belt 02.

(3) Technique shown in FIG. 16, or described in Japanese Patent Laid-open No. Sho 58-177811:

The method shown in FIG. 16 can solve the problem of the method shown in FIG. 15. That is, according to the method shown in FIG. 16, a roll 06 formed with a plurality of circumferential slits is used (this roll will be referred to also as Low Lateral Force roll or LLF roll for short). With the use of the LLF roll, the crosswise movement of the belt 02 can be absorbed without axial slippage on the roll 06 to thereby reduce an edge force applied to each of belt edge guide members 07 (edge guides). In this method, the edge force varies with form errors of crosswise movement factors such as parallelism of the roll 06 and other parallel rolls, cylindricity of the belt 02, and cylindricity of each roll. By suppressing the form errors of the crosswise movement factors to a certain level or less, the edge force can be stabilized to about 20N.

However, unless the crosswise movement factors are property set, a force (edge force) applied to each side edge of the belt 02 cannot be reduced to cause belt damage even by the technique using the LLF roll 06 shown in FIG. 16. In particular, an intermediate transfer belt using polycarbonate as the belt material is weak against load. If the belt is subjected to repeated load and sliding contact with the edge guides 07 due to the edge force, the belt becomes susceptible to belt damage such as wear, bend, or crack of each side edge. Further, in performing high-quality transfer with a paper feeding belt using PET (polyethylene terephthalate) or the like as the belt material, the thickness of the belt must be made small. Accordingly, the belt is similarly susceptible to belt damage.

When the belt damage occurs, the belt is conventionally exchanged. However, since frequent exchange of the belt is uneconomical, a belt feeding device less subjected to the belt damage has been demanded. Accordingly, a belt feeding device which can more reduce the edge force has been demanded. While the edge force can be reduced by reducing the form errors of the crosswise movement factors mentioned above, the reduction in the form errors is difficult to attain in a belt feeding device to be mass-produced. Furthermore, as the crosswise movement factors change in exchanging the belt, it is also difficult to maintain the value of the edge force less than 20N for a long time.

The less the edge force, the more desirable for the reduction in belt damage. However, no easy-to-adjust parameter for reducing the edge force has conventionally been known. Accordingly, the conventional belt feeding device with the edge force of about 20N is manufactured by increasing the axial uniformity of a roll diameter, the parallelism of roll shafts, etc. to some extent.

The present inventors have investigated to easily manufacture a belt feeding device which can reduce the edge force to about 15N or less. That is, the present inventors have investigated the parameter and the way of adjustment thereof to reduce the edge force applied to the belt of the belt feeding device to about 15N or less. As the result of investigation, it has been found that the edge force can be reduced to 15N or less by setting a load to an axial displacement of the belt wrapped around the rolls to 80 N/mm or less. Furthermore, it has been found that the setting of this load to the axial displacement of the belt to 80 N/mm or less can be easily attained by adjusting the form of the slits of the LLF roll. Thus, the present invention has been achieved in these circumstances.

SUMMARY OF THE INVENTION

It is accordingly an object of the present invention to provide a belt feeding device which can reduce an edge force acting between either side edge of the belt and the corresponding guide member against which the side edge of the belt abuts.

It is another object of the present invention to provide such a belt feeding device which can be easily manufactured.

In the following description of the present invention, the elements of the present invention will be followed by reference numerals in parentheses denoting the elements of a preferred embodiment to be hereinafter described, for ease of understanding of the correspondence between the present invention and the preferred embodiment.

It is to be noted that the following description of the present invention in correspondence with the preferred embodiment is merely intended to facilitate the understanding of the present invention and that the scope of the present invention is not limited to the preferred embodiment.

According to a first aspect of the present invention, there is provided a belt feeding device (1) comprising a plurality of belt feeding rolls (9, 14) rotatably arranged in spaced relationship from each other, driving means (11) for rotating one (9) of the rolls (9, 14), a belt (16) wrapped around the rolls (9, 14), and at least a pair of guide members (12) each having an edge guide surface (12a) against which either side edge of the belt (16) abuts when the belt (16) moves in a crosswise direction thereof, wherein: the guide members (12) are supported to frames (2 to 5) for supporting shafts of the rolls (9, 14); each of the guide members (12) has a belt supporting cylindrical surface (12b) projecting from the edge guide surface (12a); an outer circumferential surface of each of the rolls (9, 14) is formed with a plurality of ring-shaped slits (14a) axially spaced a distance w from each other, each of the slits (14a) having a depth h and a width m; and values of the depth h, the width m, and the distance w are set so that a load to an axial displacement of the belt (16) wrapped around the rolls (9, 14) at a position of the each guide member (12) becomes 80 N/mm or less.

According to a second aspect of the present invention, there is provided a belt feeding device (1) comprising a plurality of belt feeding rolls (9, 14) rotatably arranged in spaced relationship from each other, driving means (11) for rotating one (9) of the rolls (9, 14), a belt (16) wrapped around the rolls (9, 14), and at least a pair of guide members (12) each having an edge guide surface (12a) against which either side edge of the belt (16) abuts when the belt (16) moves in a crosswise direction thereof, wherein: the guide members (12) are supported rotatably and axially slidably on shafts of the rolls (9, 14) supported to frames (2 to 5); an elastic member (31) is provided to bias each of the guide members (12) against an end surface of each of the rolls (9, 14); each of the guide members (12) has a belt supporting cylindrical surface (12b) projecting from the edge guide surface (12a); an outer circumferential surface of each of the rolls (9, 14) is formed with a plurality of ring-shaped slits (14a) axially spaced a distance w from each other, each of the slits (14a) having a depth h and a width m; and values of the depth h, the width m, and the distance w are set so that a load to an axial displacement of the belt (16) wrapped around the rolls (9, 14) at a position of the each guide member (12) becomes 80 N/mm or less.

The operation of the present invention having the above-mentioned configuration will now be described.

In the belt feeding device (1) according to the first aspect of the present invention, the belt (16) is supported by the plural belt feeding rolls (9, 14) rotatably arranged in spaced relationship from each other. When one (9) of the rolls (9, 14) is rotated by the driving means (11), the belt (16) is fed.

A force in the crosswise direction (the direction perpendicular to a belt feeding direction) is applied to the belt (16) because of the errors of forms of the rolls (9, 14), parallelism of the shafts of the rolls (9, 14), etc. Accordingly, the belt (16) moves in the crosswise direction to come into contact with the guide members (12) fixed to the frames (2 to 5) on either side. That is, the back surface of either side edge portion of the belt (16) moving in the crosswise direction is first supported by the cylindrical surface (12b) of each guide member (12) on either side, and the side edge of the belt (16) on the same side is then supported so as to abut against the edge guide surface (12a) of the guide member (12).

Further, the outer circumferential surface of each of the rolls (9, 14) is formed with the plural ring-shaped slits (14a) axially spaced a distance w from each other, each of the slits (14a) having a depth h and a width m. The values of h, m, and w are set so that a load to an axial displacement of the belt (16) wrapped around the rolls (9, 14) at a position of each guide member (12) becomes 80 N/mm or less.

Accordingly, when applying a crosswise force (side force) F to the belt (16), it can be moved in the crosswise direction by a small force (a force of 80 N/mm or less).

When the belt (16) is forced to further move in the crosswise direction after abutting against the edge guide surface (12a) of the guide member (12), the belt (16) is forced back by a reaction force from the edge guide surface (12a). At this time, since the load to the axial displacement of the belt (16) becomes 80 N/mm or less, the crosswise movement of the belt (16) forced in the crosswise direction can be stopped by a small reaction force (the reaction force applied from the edge guide surface (12a) to the belt (16)).

In the belt feeding device (1) according to the second aspect of the present invention, the elastic member (31) is provided to bias each guide member (12) against an end surface of each roll. Accordingly, fluctuations in the force applied between each side edge of the belt (16) and the corresponding edge guide surface (12a) due to the crosswise movement of the belt (16) can be absorbed by the elastic member (31), thereby reducing belt damage.

As described above, according to the belt feeding device of the present invention, an edge force acting between either side edge of the belt and the guide member against which the side edge of the belt abuts can be reduced to thereby suppress belt damage.

Other objects and features of the invention will be more fully understood from the following detailed description and appended claims when taken with the accompanying drawings.

DETAILED DESCRIPTION OF THE PREFERRED EMBODIMENTS

Figure 1:
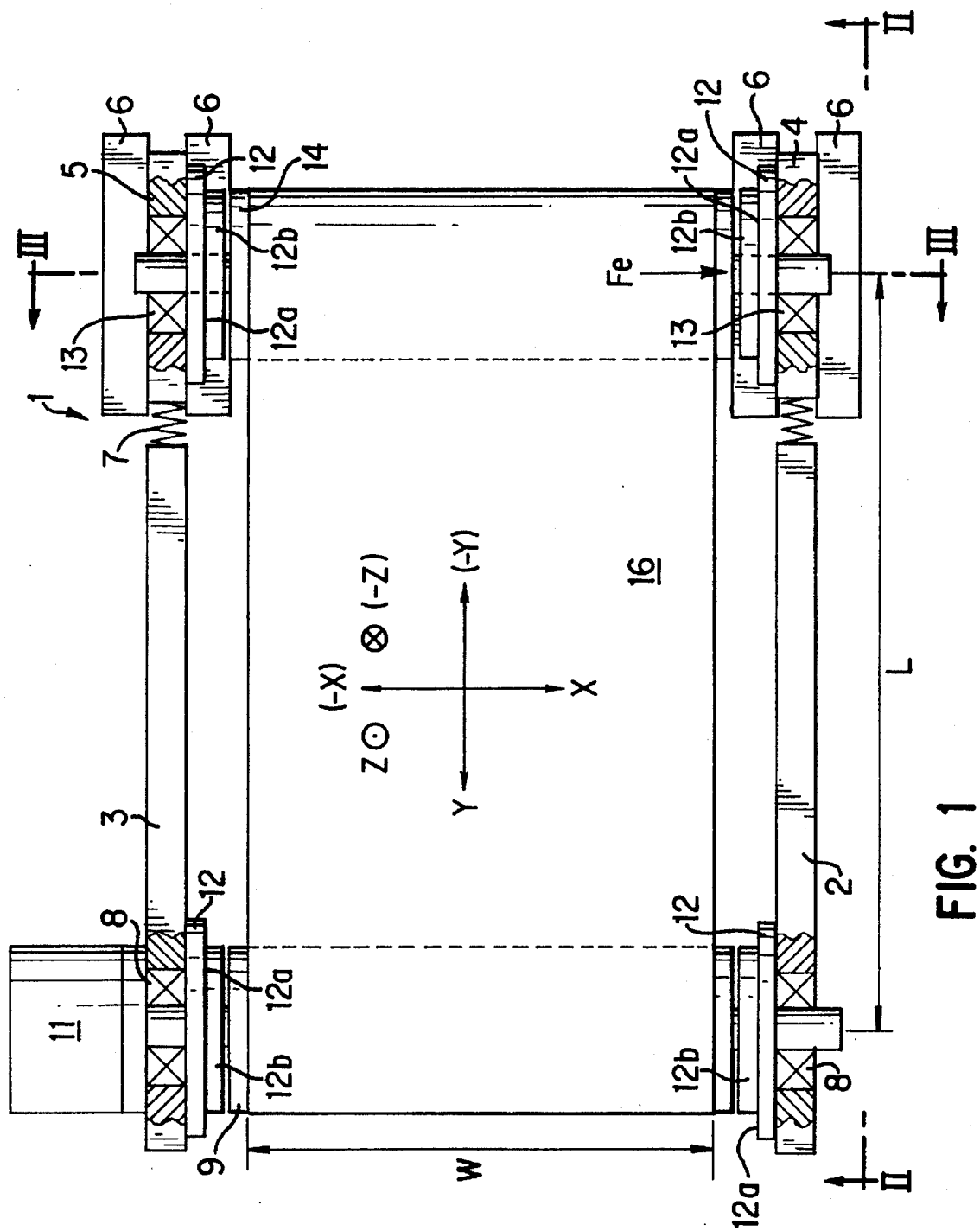
FIG. 1 is a plan view showing a preferred embodiment of the belt feeding device of the present invention.

A preferred embodiment of the present invention will now be described with reference to the drawings; however, the present invention is not limited to the following preferred embodiment.

For ease of understanding of the following description, an X axis, Y axis, and Z axis as orthogonal coordinate axes will be defined in the directions of arrows X, Y, and Z orthogonal to each other in the drawings, respectively. Further, the directions of arrows X, Y, and Z will be defined as frontward, leftward, and upward directions, respectively. In accordance with this definition, the direction opposite to the X direction (frontward direction) becomes a rearward direction (-X direction or counter-X direction); the direction opposite to the Y direction (leftward direction) becomes a rightward direction (-Y direction or counter-Y direction); and the direction opposite to the Z direction (upward direction) becomes a downward direction (-Z direction or counter-Z direction).

Further, the frontward direction (X direction) and the rearward direction (-X direction) will be collectively referred to as a transverse direction or X-axis direction; the leftward direction (Y direction) and the rightward direction (-Y direction) will be collectively referred to as a longitudinal direction or Y-axis direction; and the upward direction (Z direction) and the downward direction (-Z direction) will be collectively referred to as a vertical direction or Z-axis direction.

Further, the mark shown by an encircled dot means an arrow directing from the back side of the sheet of each figure to the front side thereof, and the mark shown by an encircled cross means an arrow directing from the front side of the sheet of each figure to the back side thereof.

Figure 2:
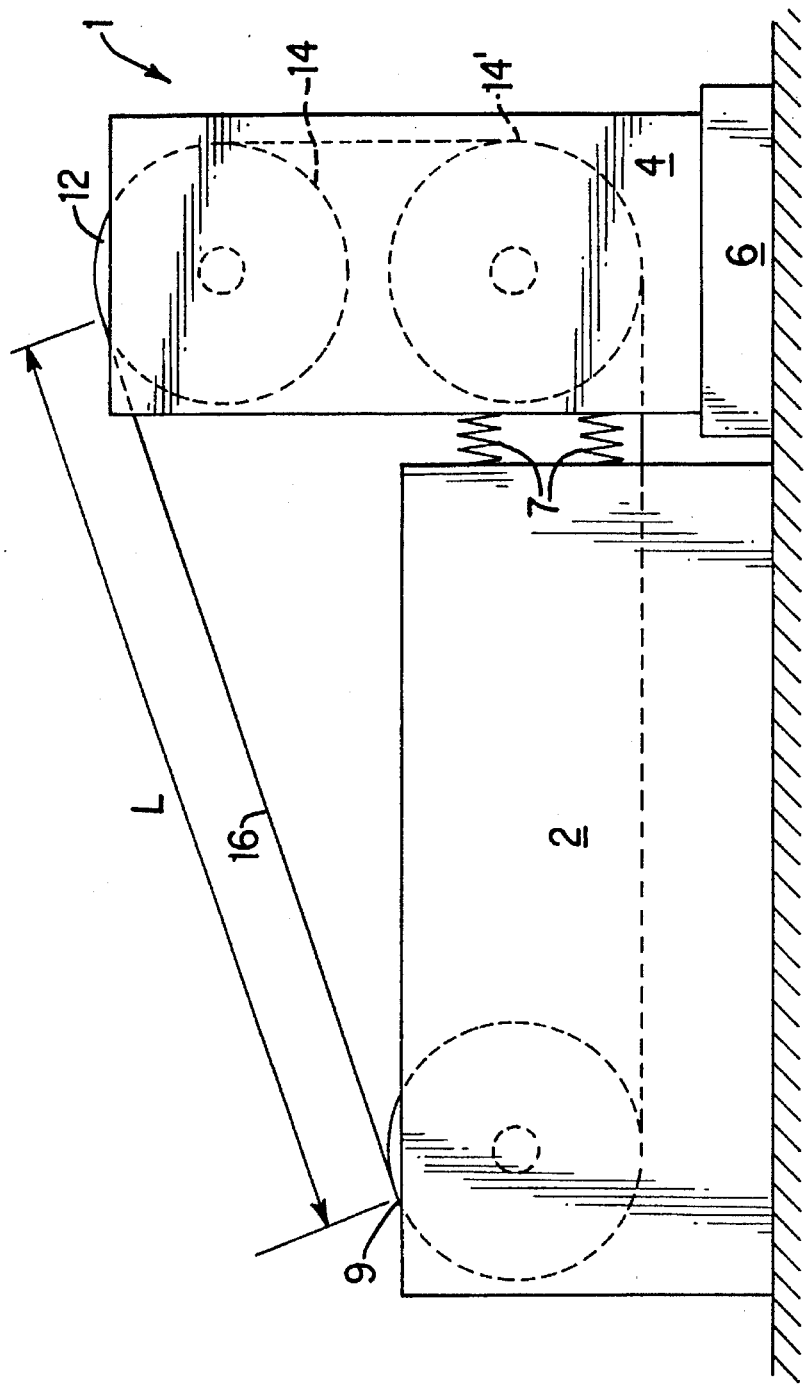
FIG. 2 is an elevational view of the preferred embodiment, corresponding to a view taken in the direction of arrows II in FIG. 1.
Figure 3:
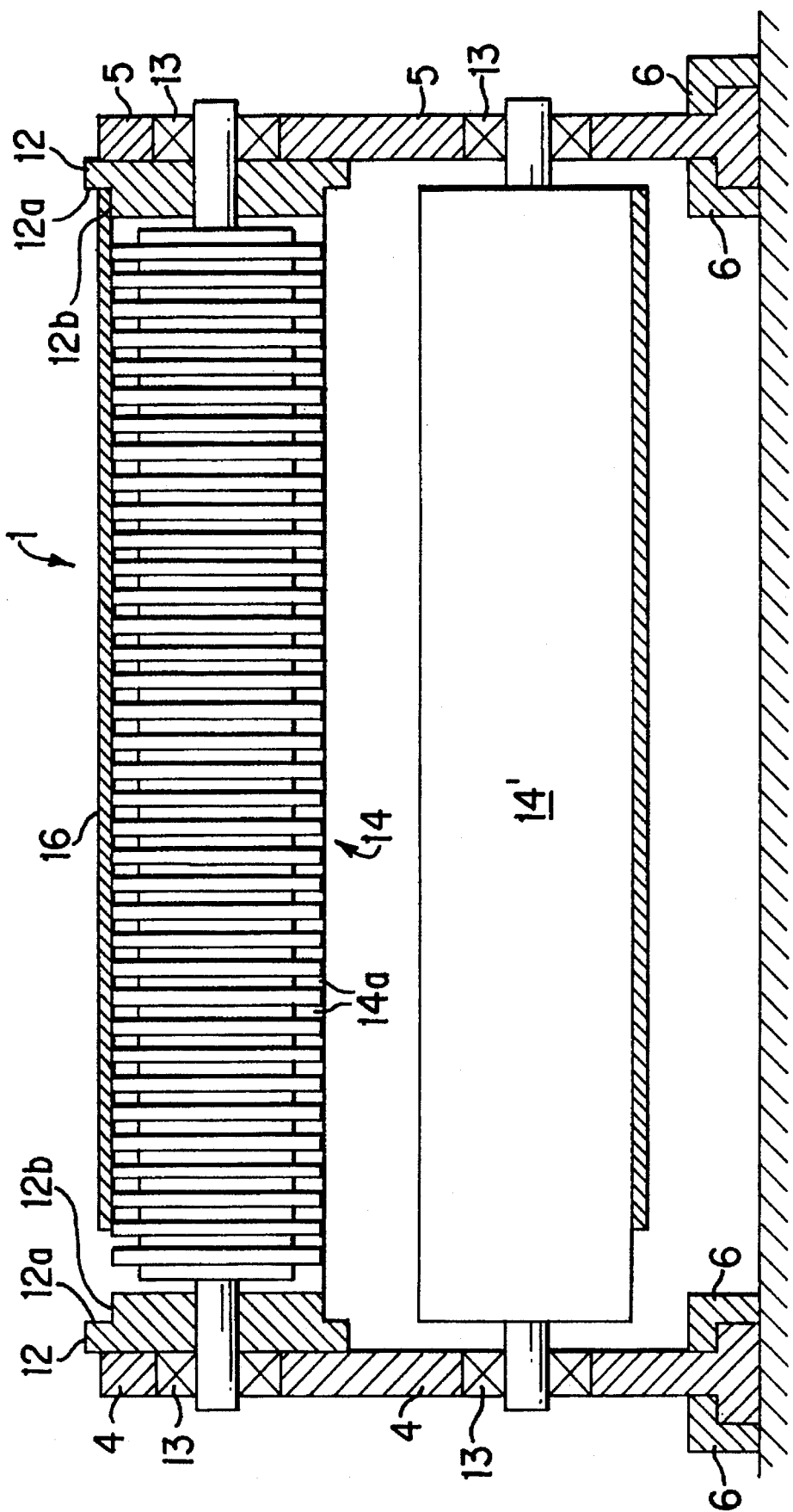
FIG. 3 is a sectional side view of the preferred embodiment, corresponding to a cross section taken along the line III—III in FIG. 1.

FIG. 1 is a plan view showing a preferred embodiment of the belt feeding device of the present invention. FIG. 2 is an elevational view of the preferred embodiment, corresponding to a view taken in the direction of arrows II in FIG. 1. FIG. 3 is a sectional side view of the preferred embodiment, corresponding to a cross section taken along the line III—III in FIG. 1.

Referring to FIGS. 1 to 3, reference numeral 1 generally designates a belt feeding device. The belt feeding device 1 has a pair of fixed frames 2 and 3 spaced apart from each other in the transverse direction (X-axis direction) and a pair of tension frames 4 and 5 similarly spaced apart from each other in the transverse direction (X-axis direction). As understood from FIGS. 1 and 3, each of the tension frames 4 and 5 is adapted to be slidable in the longitudinal direction (Y-axis direction) by a pair of guides 6. Further, as understood from FIGS. 1 and 2, compression springs 7 are interposed between the tension frame 4 and the fixed frame 2, and other compression springs 7 are similarly interposed between the tension frame 5 and the fixed frame 3. Accordingly, the tension frames 4 and 5 are normally biased in the rightward direction (-Y direction) by the compression springs 7.

A drive roll 9 is rotatably supported through bearings 8 to the fixed frames 2 and 3. The drive roll 9 is adapted to be rotated by a belt drive motor (i.e., driving means) 11.

A pair of guide members 12 are fixed to the inside surfaces of the tension frames 4 and 5 at their upper portions opposed to each other. Similarly, another pair of guide members 12 are fixed to the inside surfaces of the fixed frames 2 and 3 at positions opposed to both ends of the drive roll 9. Upper and lower tension rolls 14 and 14' are rotatably supported through bearings 13 to the tension frames 4 and 5. The upper tension roll 14 is disposed between the pair of guide members 12. The lower tension roll 14' is disposed under the upper tension roll 14. The lower tension roll 14' is formed as a roll having a normal cylindrical surface. On the other hand, the upper tension roll 14 is formed as an LLF roll (Low Lateral Force roll) having a plurality of circumferential slits as shown in FIG. 3. Although not shown, the drive roll 9 is also formed as a similar LLF roll. The details of each guide member 12 and the upper tension roll 14 will be hereinafter described.

A belt 15 is wrapped under tension around the drive roll 9 and the tension rolls 14 and 14'.

Figure 4A:
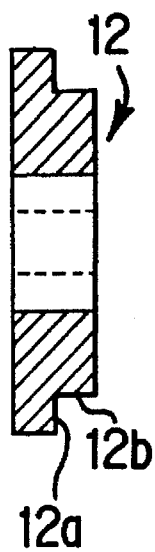
FIG. 4A is a sectional view of a guide member used in the preferred embodiment.
Figure 4B:
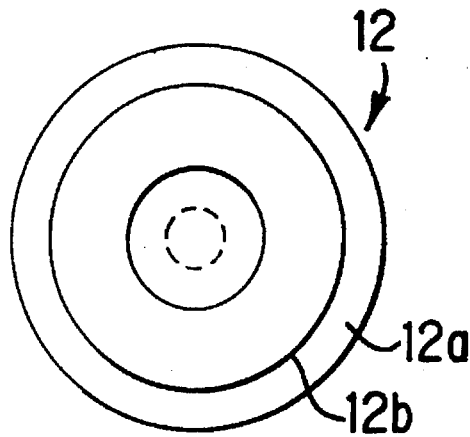
FIG. 4B is an elevational view of the guide member shown in FIG. 4A.

Referring to FIGS. 4A and 4B, the guide member 12 has an edge guide surface 12a against which either side edge of the belt 16 is adapted to abut and a cylindrical surface 12b projecting from the edge guide surface 12a to support the back surface of either side edge portion of the belt 16. The cylindrical surface 12b has an outer diameter equal to that of the roll 14. Accordingly, when the belt 16 moves in its crosswise direction, the back surface of either side edge portion of the belt 16 is supported by the cylindrical surface 12b before the side edge of the belt 16 abuts against the edge guide surface 12a. With this structure, a degree of freedom of either side edge portion of the belt 16 is restricted by the cylindrical surface 12b, thereby suppressing the occurrence of buckling of the belt 16 and the occurrence of belt damage.

The pair of guide members 12 must be located only at both ends of any one of the rolls 9, 14, and 14', whereby the axial (crosswise) movement of the belt 16 can be stopped at the time when either side edge of the belt 16 abuts against the edge guide surface 12a of each guide member 12 on either side. Accordingly, it is sufficient that the pair of guide members 12 are to be located at both ends of any one of the rolls 9, 14, and 14'. Preferably, the pair of guide members 12 are located at both ends of the roll 14 which is located most apart from the drive roll 9.

The whole of the cylindrical surface 12b is not necessarily made cylindrical, but the half of the cylindrical surface 12b necessary for guiding the belt 16 (i.e., the half for wrapping the belt 16) may be made cylindrical (specifically, semicylindrical).

Figure 5:
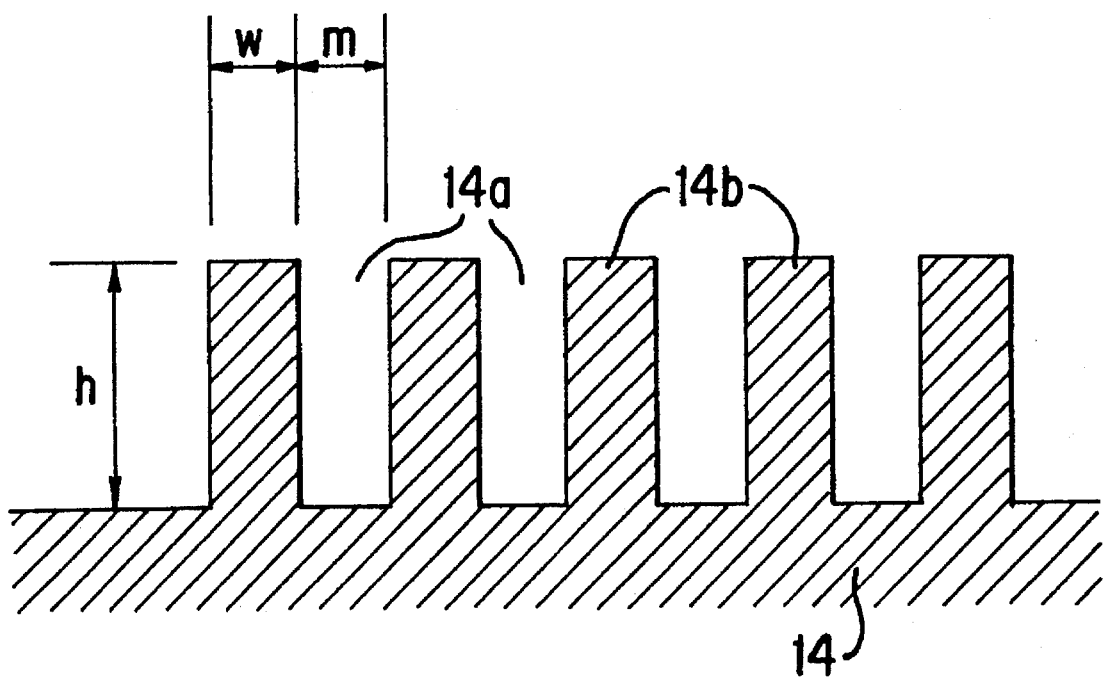
FIG. 5 is a fragmentary enlarged view of a tension roll as an LLF roll used in the preferred embodiment.

As shown in FIG. 5, the tension roll 14 as the LLF roll is formed with a plurality of slits 14a each having a depth h and a width m and with a plurality of ring-shaped plates 14b each projecting between adjacent ones of the plural slits 14a and having a height h and a width w.

In this preferred embodiment, the tension roll 14 is formed as the LLF roll, and the values of the above sizes h, m, and w are limited to respective proper ranges to be determined by the axial rigidity of the belt 16 (i.e., the rigidity of the belt 16 in the axial or crosswise direction, that is, the degree of difficulty of deformation of the belt 16 in the crosswise direction when applying an axial force to the belt 16 wrapped around the roll 14). The axial rigidity of the belt 16 depends on the material of the belt 16, the form of the belt 16 such as its thickness and width, the tension applied to the belt 16, etc. In this preferred embodiment, the materials, sizes, etc. of the belt 16 and the tension roll 14 are set as follows:

Material of the belt 16: PET (polyethylene terephthalate)

Thickness t of the belt 16: 0.1 mm

Length L of the belt 16 stretched between the drive roll 9 and the tension roll 14: 816 mm Width W of the belt 16: 362 mm Tension T applied to the belt 16: 50N Material of the tension roll 14: EPDM (Ethylene-Propylene-Diene Methylene) HS: 50 (Hardness defined by JIS K6301)

Diameter of the tension roll 14: 31 mm

Wrapping angle of the belt 16: 102° (an angle of wrapping of the belt 16 around the tension roll 14, or a central angle of the tension roll 14 contacting with a part of the belt 16)

h: 7.5 mm m: 1.2 mm w: 1.4 mm

The reason of setting of h, m, and w to the above values will now be described.

Figure 6:
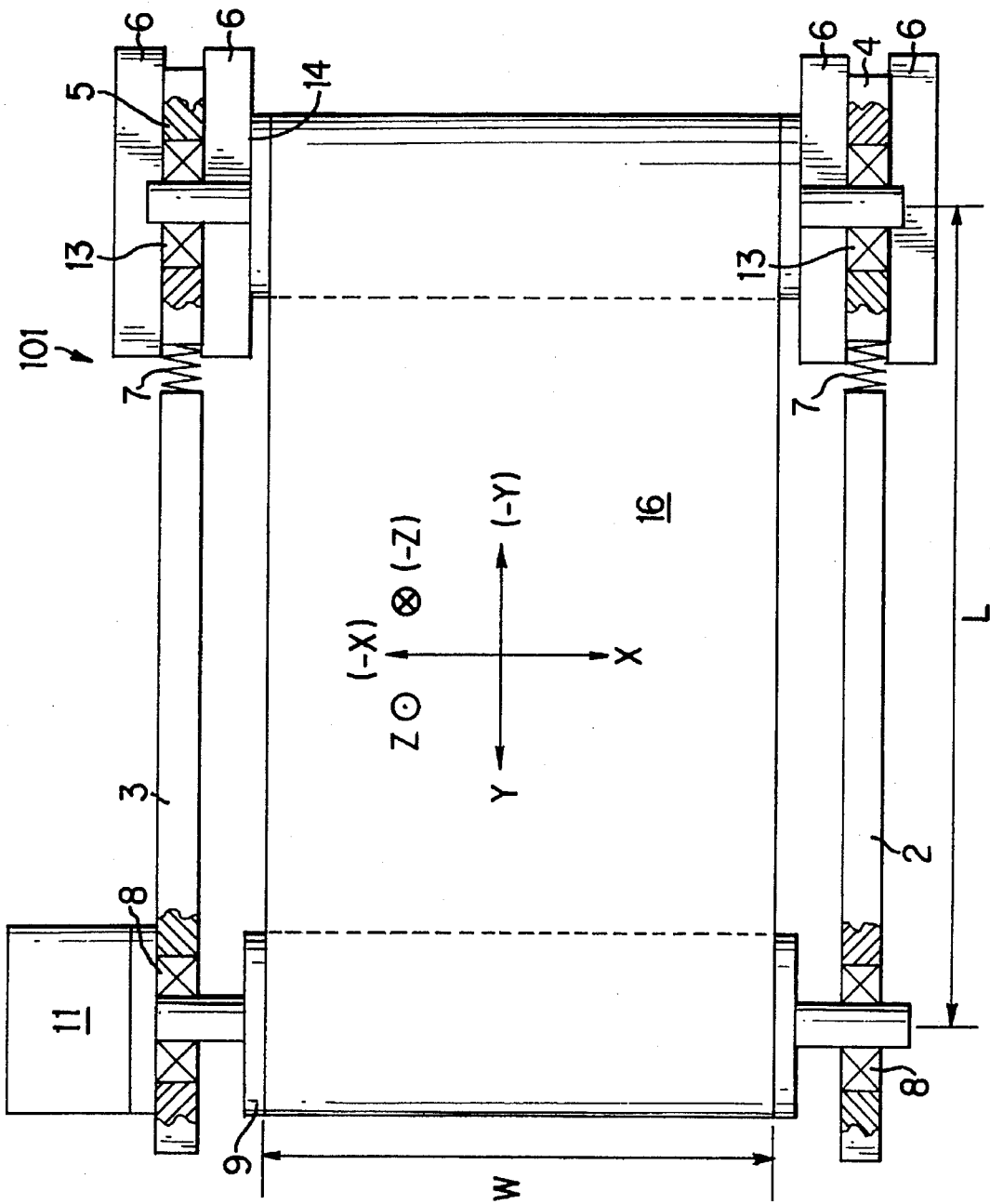
FIGS. 6, 7, and 8 are plan views illustrating the operation of the preferred embodiment.
Figure 7:
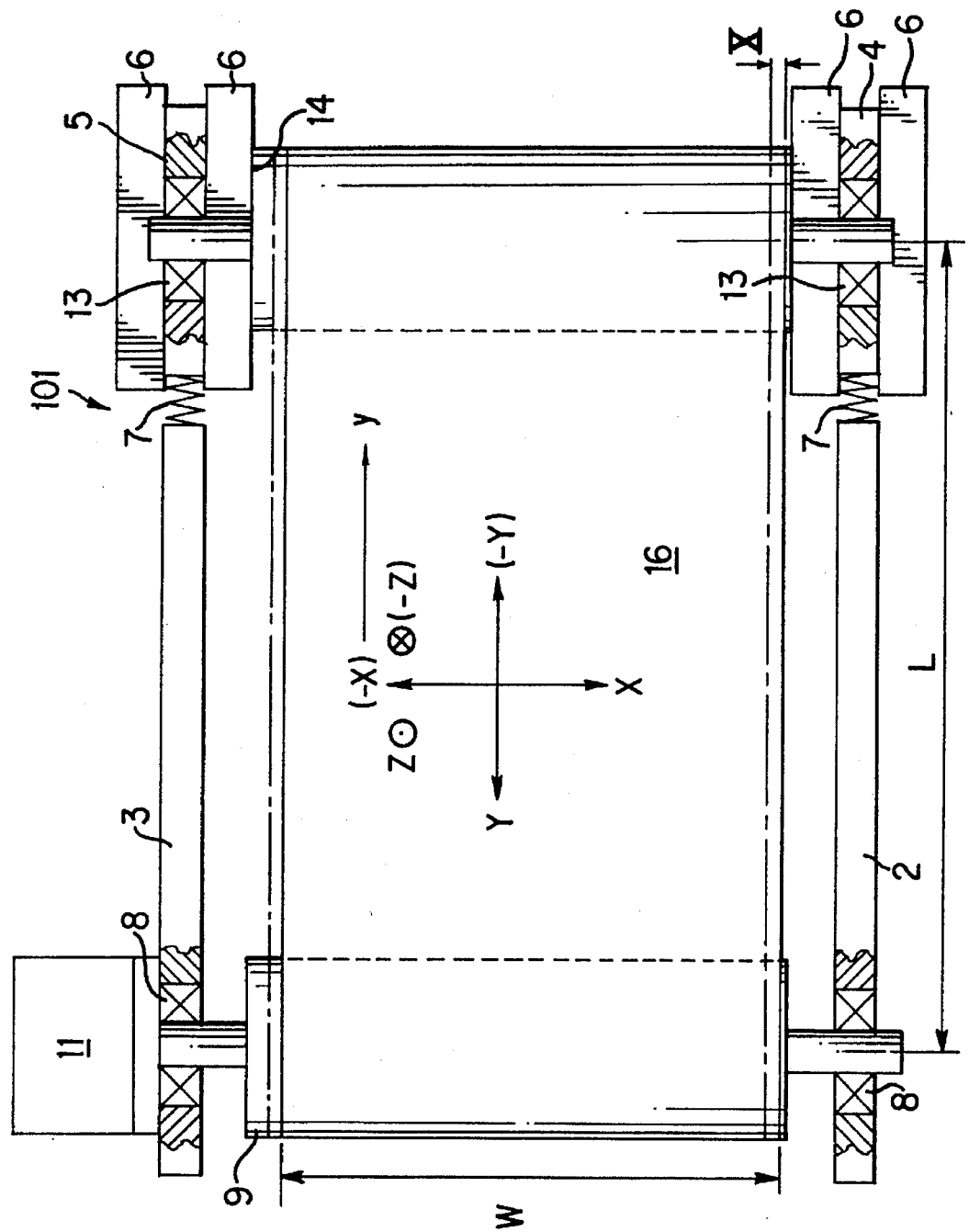
Figure 8:
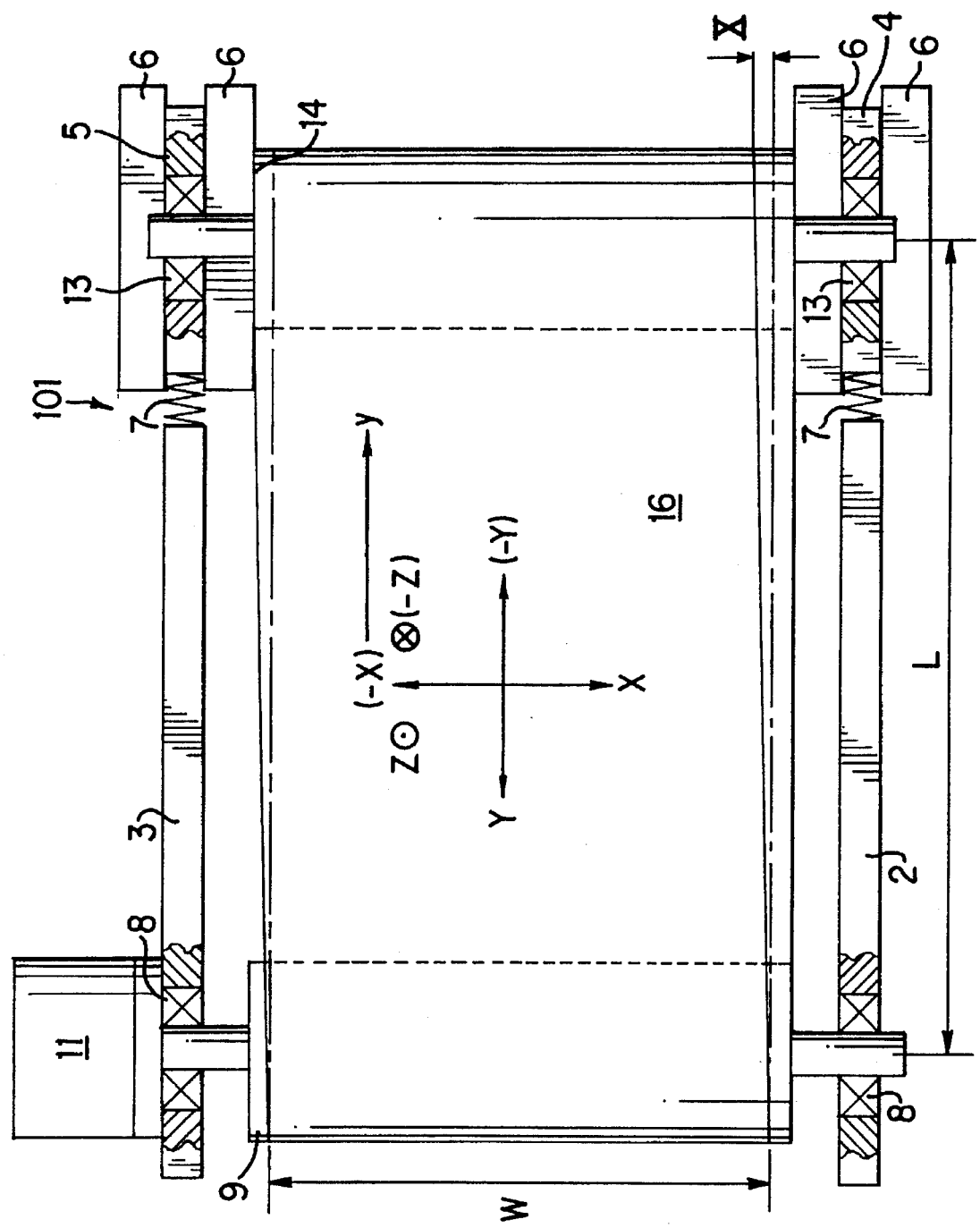

We now consider a belt feeding device 101 as shown in FIGS. 6, 7, and 8. The belt feeding device 101 is the same as the belt feeding device 1 shown in FIG. 1 with the exception that the guide members 12 are omitted.

As shown in FIG. 6, the belt feeding device 101 does not include the guide members 12. Therefore, when the belt 16 starts to be driven at a constant speed, the belt 16 gradually moves in the axial direction (the crosswise direction).

In general, when the belt 16 is driven at a constant speed, the direction and the velocity of crosswise movement of the belt 16 are constant.

As shown in FIG. 7, supposing that when the belt 16 moves by an amount y in the belt feeding direction, the belt 16 moves by an amount x in the crosswise direction (the axial direction), the proportion of the crosswise movement, $\alpha$ (=x/y) becomes a constant value. In other words, the amount of the crosswise movement of the belt 16 relative to the feed amount of the belt 16 becomes constant. The crosswise movement proportion $\alpha$ mentioned above depends on axial nonuniformity of various crosswise movement factors such as parallelism of the rolls 9, 14, and 14', cylindricity of the belt 16, and cylindricity of the rolls 9, 14, and 14'. If the axial nonuniformity of these crosswise movement factors is fixed, the crosswise movement proportion $\alpha$ becomes constant.

In the case where the guide members 12 are provided in the belt feeding device 101 shown in FIG. 7 as similar to the belt feeding device 1 shown in FIG. 1 in order to suppress the crosswise movement of the belt 16, that is, in the case of the belt feeding device 1 shown in FIG. 1, an axial (crosswise) force acting between each guide member 12 and the belt 16, i.e., an edge force Fe, is proportional to the crosswise movement proportion $\alpha$. This relation is expressed as follows:

$$Fe = K\alpha \quad (1)$$

where K is a proportional constant.

As understood from Eq. (1), the edge force Fe can be reduced by reducing either the crosswise movement proportion $\alpha$ or the proportional constant K. The crosswise movement proportion $\alpha$ cannot be made zero from a manufacturing point of view. An usual manufacturing tolerance causes a crosswise movement proportion $\alpha$ of about 0.0001 (i.e., a crosswise movement amount of 0.1 mm relative to a feed amount of 1 m). This value of the crosswise movement proportion $\alpha$ is difficult to further reduce, and adjustment of this value requires an adjusting mechanism and an adjusting manhour, causing an increase in cost. Accordingly, it is desirable to reduce the proportional constant K.

The proportional constant K can be measured in the following manner. Referring to FIG. 8, if a load F is crosswise applied to the belt 16 in its stationary condition at a position where either guide member 12 shown in FIG. 1 is to be located, the belt 16 stretched between the rolls 9 and 14 is displaced by an amount $\delta$ in the axial direction (the crosswise direction). The relation between F, $\delta$ and K is expressed as $K \propto F/\delta$.

Figure 9:
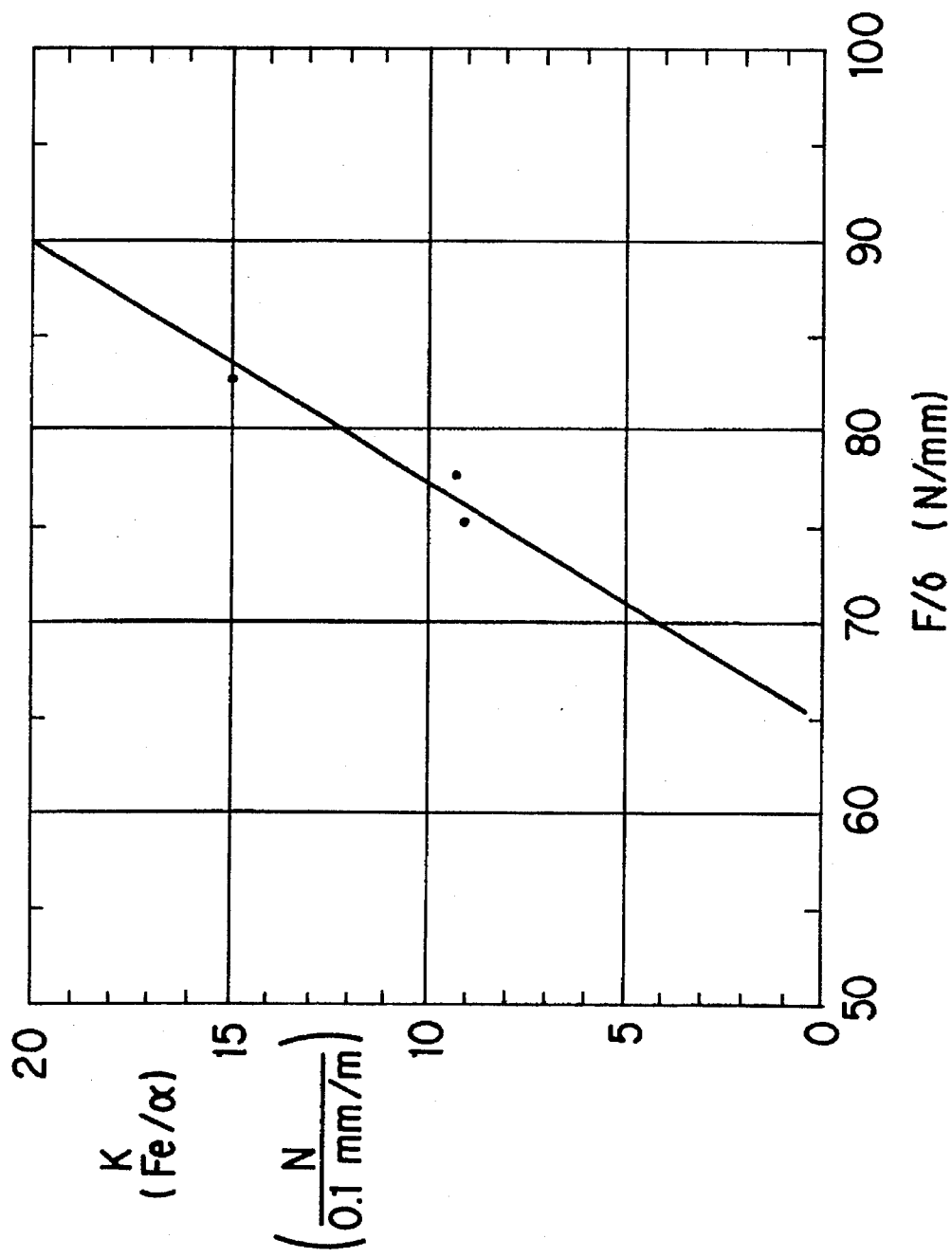
FIG. 9 is a graph showing the relation between $K$ ($=Fe/\alpha$) and $F/\delta$.

This relation between K and $F/\delta$ is graphed in FIG. 9. In FIG. 9, the axis of abscissa represents $F/\delta$, and the axis of ordinate represents K expressed in Eq. (1).

In accordance with the relation shown in FIG. 9, the edge force Fe can be reduced to 15N or less by setting the value of $F/\delta$ to 83 N/mm or less in the case of $\alpha$=0.1 mm. Further, when the value of $F/\delta$ is set to 80 N/mm or less, the value of K becomes 12 {N/(0.1 mm/m)}. Even in the case of $\alpha$=0.1 ×(15/12) =0.125 mm, the edge force Fe can be reduced to 15N or less by setting the value of $F/\delta$ to 80 N/mm or less. In this manner, the edge force Fe due to various crosswise movement factors can be reduced by reducing the value of $F/\delta$.

The value of $F/\delta$ is determined by the axial rigidity of the tension roll 14 (the rigidity of the tension roll 14 in its axial direction) and the axial rigidity of the belt 16 stretched between the rolls 9 and 14 (the rigidity of the belt 16 in the axial direction of the roll 14). The value of $F/\delta$ can be reduced by reducing the axial rigidity of the tension roll 14 and the axial rigidity of the belt 16.

The axial rigidity of the belt 16 is determined by the length L of the belt 16 stretched between the rolls 9 and 14, the width W of the belt 16, the thickness t of the belt 16, the Young's modulus E of the belt 16, etc. The axial rigidity of the belt 16 can be reduced by reducing the values of W, t, and E and increasing the value of L. On the other hand, the axial rigidity of the tension roll 14 is determined by the material of the ring-shaped plates 14b and the values of h, m, and w shown in FIG. 5. The axial rigidity of the tension roll 14 can be reduced by reducing the values of h, m, and w.

In the above-mentioned conditions that the material of the belt 16 is PET, the thickness t of the belt 16 is 0.1 mm, the length L of the belt 16 stretched between the rolls 9 and 14 is 816 mm, the width W of the belt 16 is 362 mm, the tension T applied to the belt 16 is 50N, the material of the tension roll 14 is EPDM HS:50, the diameter of the tension roll 14 is 31 mm, and the wrapping angle of the belt 16 is 102°, the value of $F/\delta$ can be reduced to 80 N/mm or less by setting the values of h, m, and w to 7.5 mm, 1.2 mm, and 1.4 mm, respectively, as mentioned above.

In this case, the values of $F/\delta$ and K become as follows:

$F/\delta$=76N/mm

K=8.8 {N/(0.1 mm/m)}

Accordingly, the edge force Fe is given below by substituting this value of K into Eq. (1) in the case of $\alpha$=0.1 mm/m.

$Fe = K\alpha = 8.8 \{N/(0.1 \text{ mm/m})\} \times (0.1 \text{ mm/m}) = 8.8N$

The operation of the preferred embodiment mentioned above will now be described.

The belt 16 in the belt feeding device 1 is supported by the drive roll 9 and the tension rolls 14 and 14' rotatably arranged in spaced relationship from each other. When the drive roll 9 is rotated by the belt driving motor 11, the belt 16 is fed.

The belt 16 moves in its crosswise direction (the direction perpendicular to a belt feeding direction) because of the errors of forms of the rolls 9 and 14, parallelism of the shafts of the rolls 9 and 14, etc., and comes into contact with the guide members 12 fixed to the frames 2 to 5. The back surface of either side edge portion of the belt 16 moving in the crosswise direction is first supported by the cylindrical surface 12b of each guide member 12 on either side, and the side edge of the belt 16 on the same side is then supported by the edge guide surface 12a of the guide member 12.

The cylindrical surface 12b of the guide member 12 contacting with the belt 16 generates a frictional resistance force against the crosswise movement of the belt 16. Accordingly, a force of abutment of the side edge of the belt 16 against the edge guide surface 12a of the guide member 12 due to the crosswise movement of the belt 16 can be reduced.

Furthermore, the outer circumferential surface of the roll 14 is formed with the ring-shaped slits 14a axially spaced the distance w from each other, each of the slits 14a having the depth h and the width m. The values of h, m, and w are set so that a load to an axial displacement of the belt 16 wrapped around the roll 14 at the position of the guide member 12 becomes 76 N/mm (that is, less than 80 N/mm).

Accordingly, when applying a crosswise force (side force) to the belt 16, it can be moved in the crosswise direction by a small force (a force less than 80 N/mm).

When the belt 16 is forced to further move in the crosswise direction after abutting against the edge guide surface 12a of the guide member 12, the belt 16 is forced back by a reaction force from the edge guide surface 12a. At this time, since the load to the axial displacement of the belt 16 becomes 76 N/mm (that is, less than 80 N/mm), the crosswise movement of the belt 16 forced in the crosswise direction can be stopped by a small reaction force (edge force) Fe of 8.8N (Newton).

Since the force (edge force) Fe applied to the side edge portion of the belt 16 is small (less than 15N) as mentioned above, damage to the side edge portion of the belt 16 can be reduced.

Having thus described a specific preferred embodiment of the present invention, it is to be noted that the present invention is not limited to the above preferred embodiment, but various modifications may be made within the scope of the present invention as defined in the appended claims. Some modifications according to the present invention will now be described.

Figure 10:
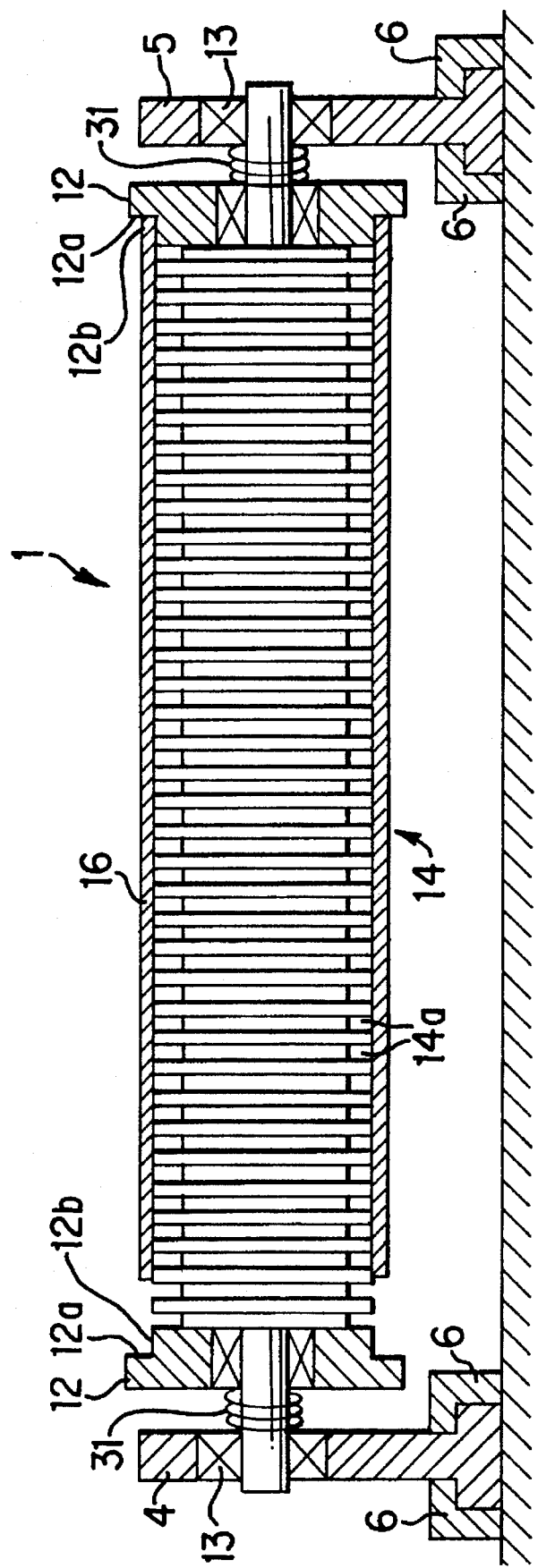
FIG. 10 is a sectional side view showing another preferred embodiment of the belt feeding device of the present invention.

As shown in FIG. 10, each guide member 12 may be supported on the shaft of the roll 14 so as to be rotatable about the shaft and axially slidable on the shaft, and may be biased by a spring 31 to abut against the corresponding end surface of the roll 14. With this arrangement, fluctuations in the force applied between each side edge of the belt 16 and the corresponding edge guide surface 12a due to the crosswise movement of the belt 16 can be absorbed by the spring 31.

Figure 11:
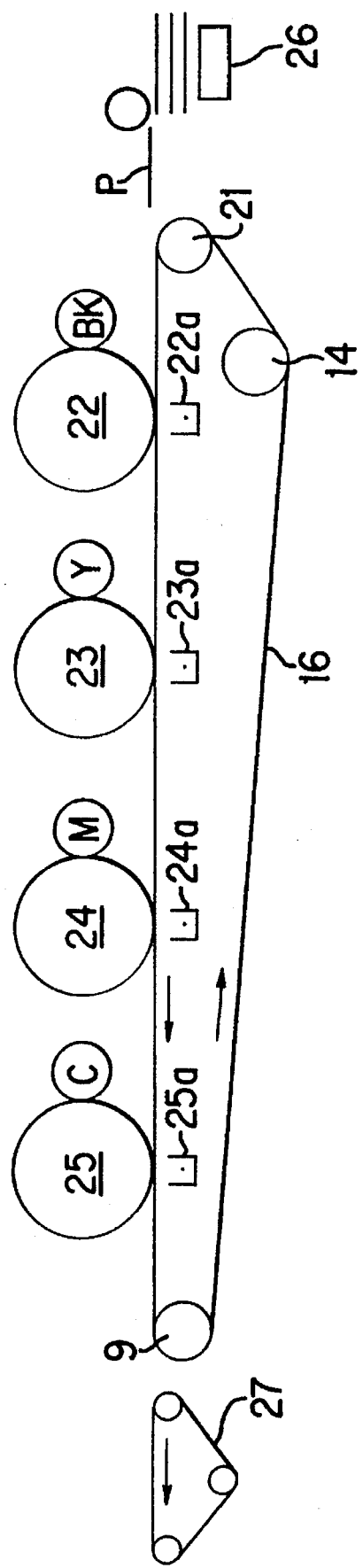
FIG. 11 is a schematic view showing an image forming apparatus to which the present invention is applied.
Figure 12:
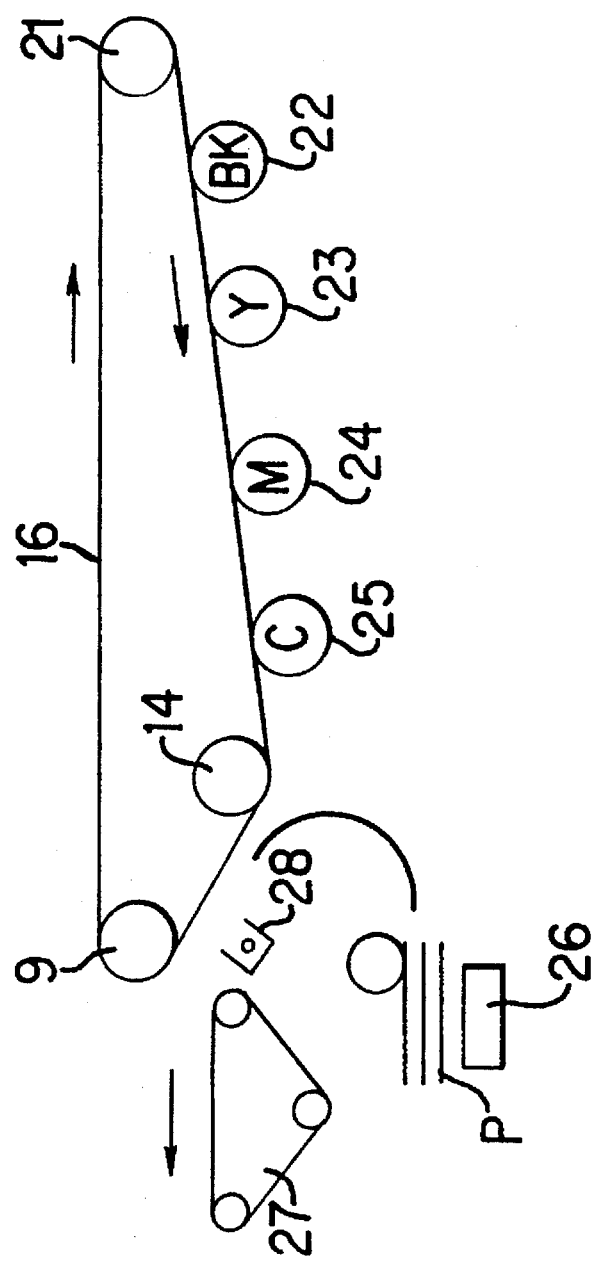
FIG. 12 is a schematic view showing another image forming apparatus to which the present invention is applied.
Figure 13:
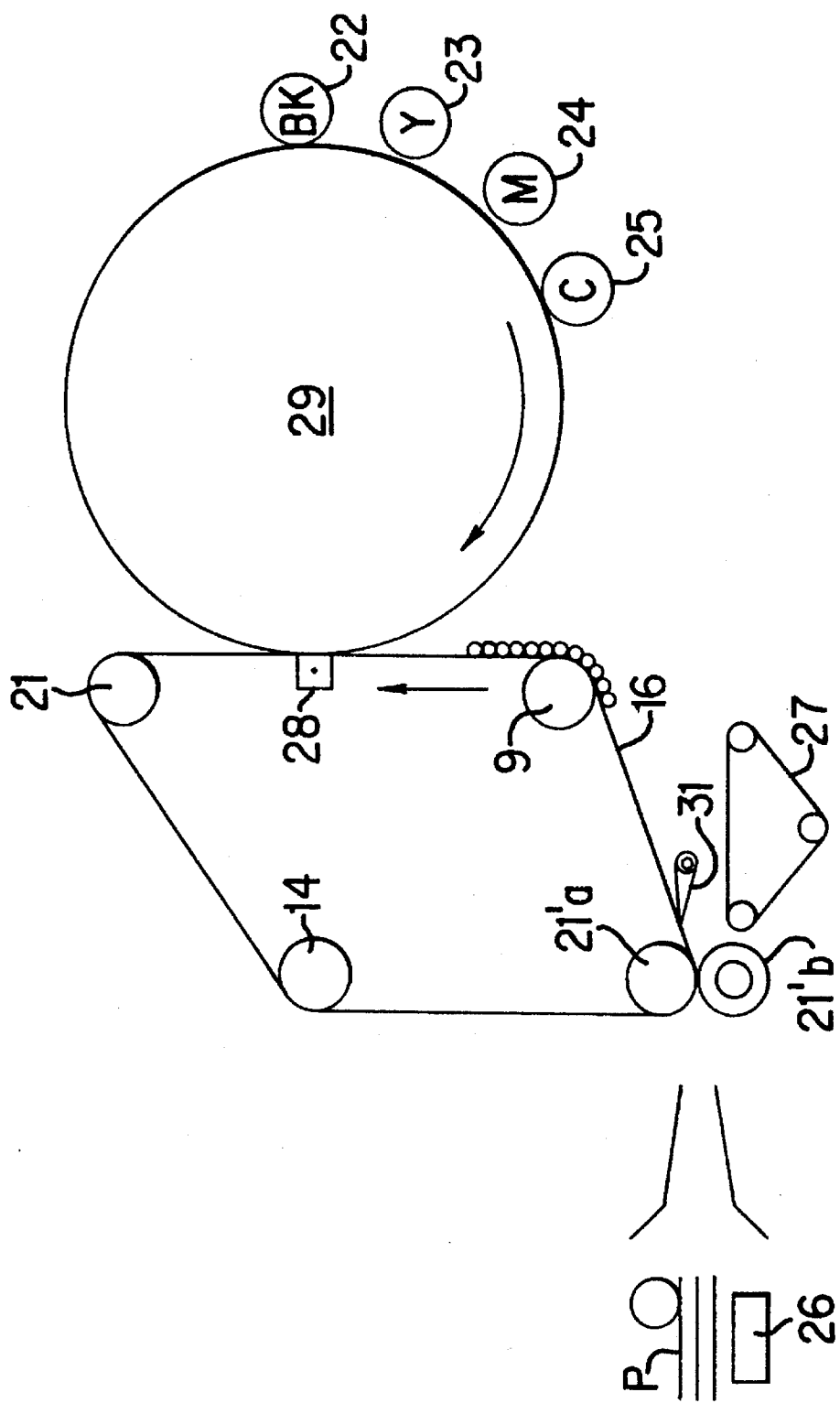
FIG. 13 is a schematic view showing still another image forming apparatus to which the present invention is applied.
Figure 14:
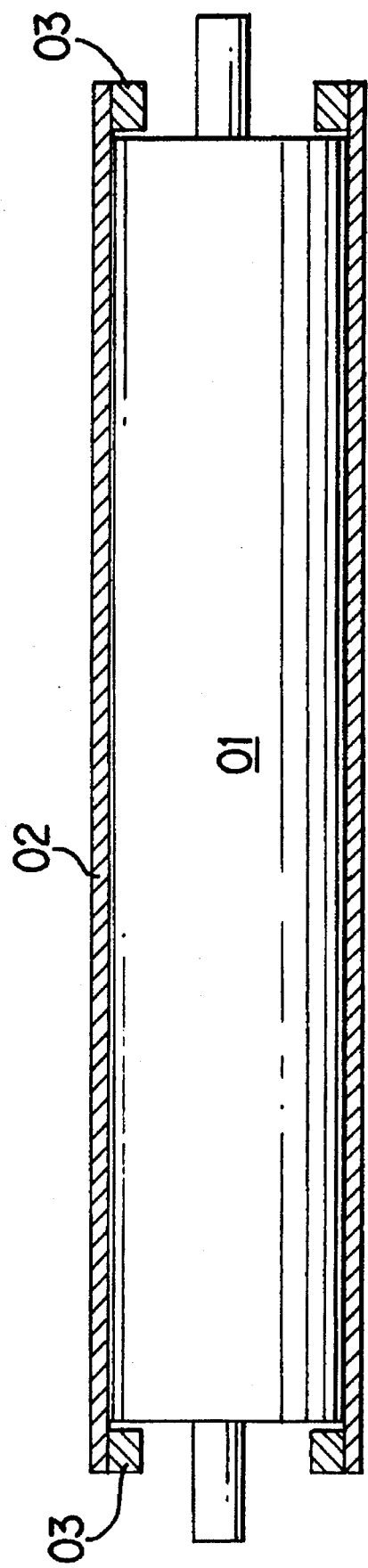
FIG. 14 is a sectional side view showing an example in the related art.
Figure 15:
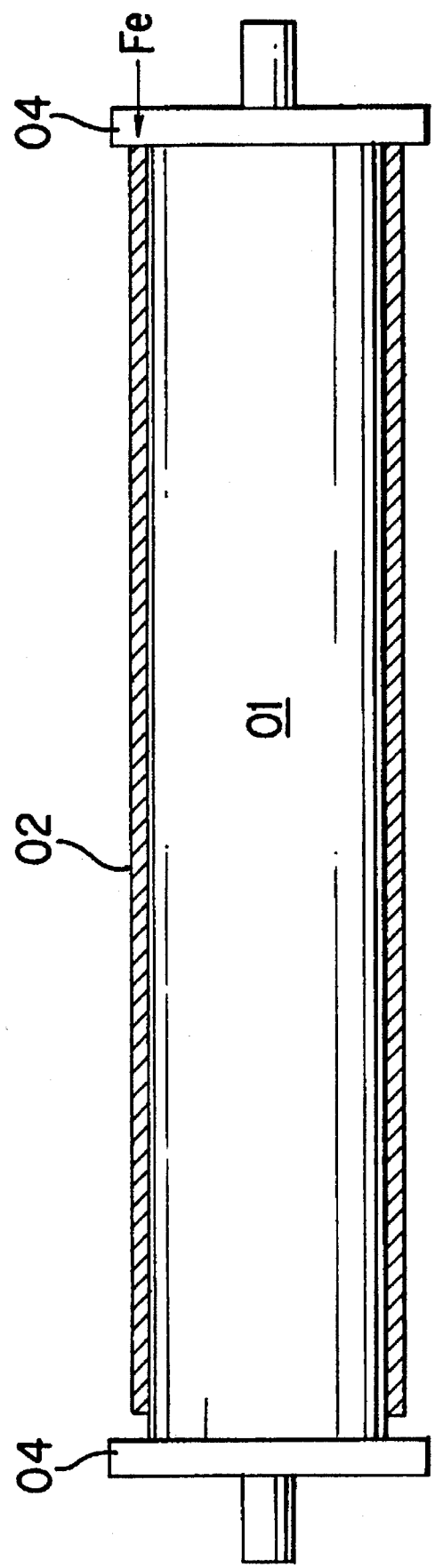
FIG. 15 is a sectional side view showing another example in the related art.
Figure 16:
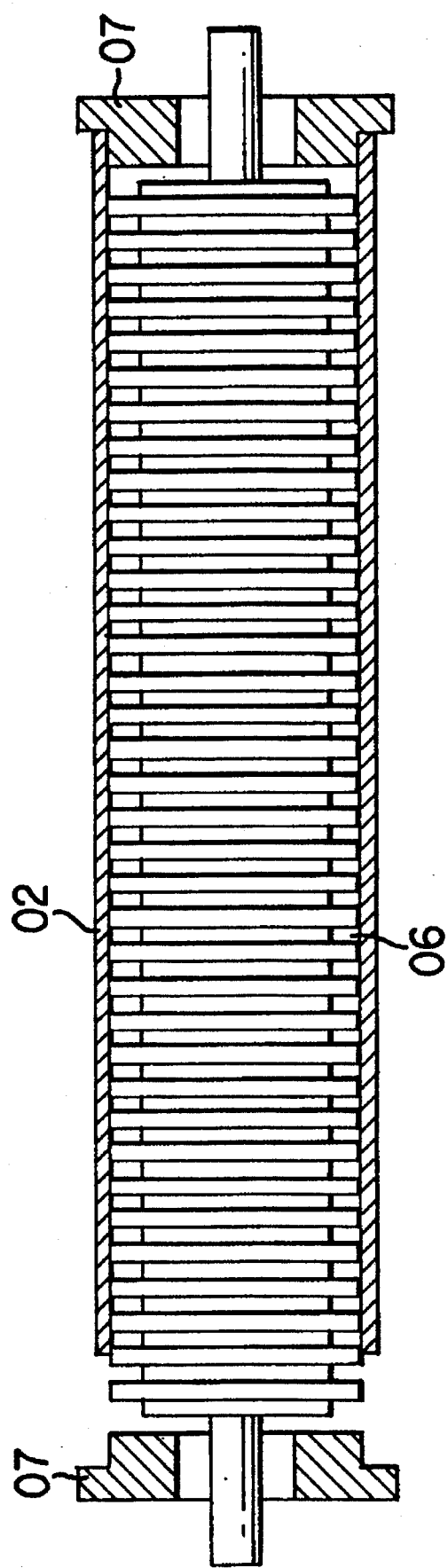
FIG. 16 is a sectional side view showing still another example in the related art.

The present invention may be applied to various image forming apparatuses as shown in FIGS. 11 to 13. In the following description with reference to FIGS. 11 to 13, the corresponding parts in FIGS. 11 to 13 will be denoted by the same reference numerals, and the repeated explanation thereof will be omitted.

In the image forming apparatus shown in FIG. 11, a transfer material feeding belt 16 is wrapped around a drive roll 9, a tension roll 14, and a driven roll 21. A black developer unit 22 using a black toner, a yellow developer unit 23 using a yellow toner, a magenta developer unit 24 using a magenta toner, and a cyan developer unit 25 using a cyan toner are arranged along the belt 16. A transfer paper P supplied from a paper feed tray 26 is fed by the belt 16, and various color toner images from the developer units 22 to 25 are transferred onto the transfer paper P by transfer corotrons 22a to 25a of the developer units 22 to 25, thus performing full-color development. Thereafter, the transfer paper P is separated from the belt 16 and is then fed to a fuser unit (not shown) by another feeding belt 27.

In the image forming apparatus shown in FIG. 12, a transfer film is employed as a belt 16. The toners from developer units 22 to 25 are directly applied to the belt 16 to form a full-color toner image on the belt 16. The toner image is then transferred by a transfer corotron 28 onto a transfer paper P supplied from a paper feed tray 26.

In the image forming apparatus shown in FIG. 13, a toner image is formed on a photosensitive drum 29 by developer units 22 to 25. Then, the toner image is transferred by a transfer corotron 28 onto a transfer paper P supplied from a paper feed tray 26 and fed by a belt 16. Thereafter, the transfer paper P is separated from the belt 16 by a belt separation pawl 31, and is then fed to a fuser unit (not shown) by another feeding belt 27.

What is claimed is:

1. A belt feeding device comprising a plurality of belt feeding rolls rotatably arranged in spaced relationship from each other, driving means for rotating one of said rolls, a belt wrapped around said rolls, and at least a pair of guide members each having an edge guide surface against which either side edge of said belt abuts when said belt moves in a crosswise direction thereof, wherein:

said guide members are supported to frames for supporting shafts of said rolls;

each of said guide members has a belt supporting cylindrical surface projecting from said edge guide surface;

an outer circumferential surface of each of said rolls is formed with a plurality of ring-shaped slits axially spaced a distance w from each other, each of said slits having a depth h and a width m; and values of said depth h, said width m, and said distance w are set so that a load to an axial displacement of said belt wrapped around said rolls at a position of said each guide member becomes 80 N/mm or less.

2. A belt feeding device according to claim 1, wherein said guide members are located at both ends of one of said rolls.

3. A belt feeding device according to claim 2, wherein said cylindrical surface has an outer diameter equal to that of said roll.

4. A belt feeding device according to claim 2, wherein said roll is a tension roll spaced most apart from a drive roll to be rotated by said driving means.

5. A belt feeding device comprising a plurality of belt feeding rolls rotatably arranged in spaced relationship from each other, driving means for rotating one of said rolls, a belt wrapped around said rolls, and at least a pair of guide members each having an edge guide surface against which either side edge of said belt abuts when said belt moves in a crosswise direction thereof, wherein:

said guide members are supported rotatably and axially slidably on shafts of said rolls supported to frames;

an elastic member is provided to bias each of said guide members against an end surface of each of said rolls;

each of said guide members has a belt supporting cylindrical surface projecting from said edge guide surface;

an outer circumferential surface of each of said rolls is formed with a plurality of ring-shaped slits axially spaced a distance w from each other, each of said slits having a depth h and a width m; and values of said depth h, said width m, and said distance w are set so that a load to an axial displacement of said belt wrapped around said rolls at a position of said each guide member becomes 80 N/mm or less.

6. A belt feeding device according to claim 5, wherein said guide members are located at both ends of one of said rolls.

7. A belt feeding device according to claim 6, wherein said cylindrical surface has an outer diameter equal to that of said roll.

8. A belt feeding device according to claim 6, wherein said roll is a tension roll spaced most apart from a drive roll to be rotated by said driving means.

* * * * *